United States Patent
Kondo et al.

(10) Patent No.: US 9,056,271 B2
(45) Date of Patent: Jun. 16, 2015

(54) CARBON DIOXIDE ABSORBING SOLUTION

(75) Inventors: Asato Kondo, Yokohama (JP); Satoshi Saito, Yamato (JP); Shinji Murai, Sagamihara (JP); Hiroko Watando, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 11 days.

(21) Appl. No.: 13/498,019

(22) PCT Filed: Sep. 24, 2009

(86) PCT No.: PCT/JP2009/004832
§ 371 (c)(1),
(2), (4) Date: Mar. 23, 2012

(87) PCT Pub. No.: WO2011/036712
PCT Pub. Date: Mar. 31, 2011

(65) Prior Publication Data
US 2012/0217437 A1   Aug. 30, 2012

(51) Int. Cl.
*C09K 3/00* (2006.01)
*B01D 53/14* (2006.01)

(52) U.S. Cl.
CPC ........ *B01D 53/1493* (2013.01); *B01D 53/1475* (2013.01); *B01D 2252/20484* (2013.01); *B01D 2252/20489* (2013.01); *B01D 2252/20494* (2013.01); *B01D 2252/504* (2013.01); *Y02C 10/06* (2013.01); *B01D 2252/604* (2013.01); *B01D 2252/606* (2013.01); *B01D 2258/0283* (2013.01)

(58) Field of Classification Search
CPC ...................................... A62B 21/00
USPC ....................................... 252/184
See application file for complete search history.

(56) References Cited

U.S. PATENT DOCUMENTS

| 4,336,233 A | * | 6/1982 | Appl et al. ............ 423/228 |
| 4,775,519 A | * | 10/1988 | Yit Nieh ............ 423/226 |
| 5,641,411 A | * | 6/1997 | Williams et al. ........ 210/749 |
| 6,688,468 B2 | * | 2/2004 | Waterman ............ 206/524.4 |
| 2004/0072783 A1 | * | 4/2004 | Breaker et al. ......... 514/44 |
| 2005/0079095 A1 | | 4/2005 | Crovetto et al. |
| 2009/0199713 A1 | | 8/2009 | Asprion et al. |
| 2011/0300623 A1 | * | 12/2011 | Gellett et al. ....... 435/289.1 |

FOREIGN PATENT DOCUMENTS

| CN | 1556694 A | 12/2004 | |
| CN | 101395303 A | 3/2009 | |
| JP | 2000 229219 | 8/2000 | |
| JP | 2000229219 A * | 8/2000 | ........ B01D 53/62 |
| JP | 2006-527153 | 11/2006 | |
| JP | 2012076046 A * | 4/2012 | |
| WO | WO 2007/087960 A1 | 8/2007 | |
| WO | 2007 134994 | 11/2007 | |
| WO | WO 2009/065218 A1 | 5/2009 | |
| WO | WO 2010/037109 A2 | 4/2010 | |
| WO | WO 2010/037109 A3 | 4/2010 | |

OTHER PUBLICATIONS

Office Action issued Jan. 9, 2013 in Australian Patent Application No. 2009353168.

International Search Report Issued Feb. 2, 2010 in PCT/JP09/04832 Filed Sep. 24, 2009.

Combined Chinese Office Action and Search Report issued Sep. 16, 2013, in Chinese Patent Application No. 200980161533.5 with English translation and English translation of category of cited documents.

Office Action issued Oct. 4, 2013 in Japanese Patent Application No. 2011-532796 (with English translation).

Extended European Search Report issued Feb. 11, 2014 in Patent Application No. 09849743.1

* cited by examiner

*Primary Examiner* — Nicole M Buie-Hatcher
*Assistant Examiner* — M. Reza Asdjodi
(74) *Attorney, Agent, or Firm* — Oblon, McClelland, Maier & Neustadt, L.L.P.

(57) ABSTRACT

The present invention provides a carbon dioxide absorbing solution capable of preventing production of an oxidization degradation product of alkanolamine, that is, BICINE. The carbon dioxide absorbing solution contains an alkanolamine and a sulfur amino acid represented by the formula (1) or (2).

6 Claims, No Drawings

CARBON DIOXIDE ABSORBING SOLUTION

TECHNICAL FIELD

This invention relates to a carbon dioxide absorbing solution for recovering exhaust gases emitted from plants and the like.

BACKGROUND ART

In view of recent growing interest in global warming and of environmental regulation enforcement, it is an urgent problem to reduce the exhaust gas emission from coal power plants. As the means for reduction of the exhaust gas emission, not only exhausting reduction by improving the efficiency of the plants but also $CO_2$ recovery by chemical absorbents is now attracting attention of the people.

As the chemical absorbents, amine compounds have long been studied on its $CO_2$ absorption. For example, carbon dioxide is introduced into an absorption tower, where the carbon dioxide is brought into contact with an alkanolamine aqueous solution alone or with a reaction accelerator such as piperazine so as to be absorbed therein; and thereafter the solution is heated to separate and recover the carbon dioxide in a desorption tower. Examples of the alkanolamine include monoethanolamine (hereinafter, referred to as "MEA") and methyl diethanolamine (hereinafter, referred to as "MDEA").

However, there are a lot of problems. For example, if the alkanolamine is so oxidized and degraded that the absorbing solution becomes acidic, the solution loses alkalinity, which plays a vital role in absorbing carbon dioxide. Further, the degradation products may corrode carbon steel used in the absorption tower.

To solve those problems, an attempt is made (for example, in Patent document 1) to incorporate an anti-oxidizing agent into the reaction system so as to reduce the oxidization and degradation of the absorbing solution. Specifically, the document discloses an invention in which a free radical scavenger such as a thiosulfate is added as the anti-oxidizing agent into the reaction system to slow down the degradation rate of MEA.

However, the document is silent about effective measures against N,N-bis-(2-hydroxyethyl)glycine (hereinafter, referred to as "BICINE"), which is an oxidization degradation product of alkanolamine and which is presumed to corrode the carbon steel. Accordingly, there still remains a problem on preventing the degradation of the absorbing solution.

PRIOR ART DOCUMENTS

[Patent document 1] Published Japanese Translation of PCT International Application No. 2006-527153

DISCLOSURE OF INVENTION

Problem to be Solved by the Invention

In consideration of the above problem, it is an object of the present invention to provide a carbon dioxide absorbing solution that prevents production of BICINE, which is an oxidization degradation product of alkanolamine.

Means for Solving Problem

The present invention resides in a carbon dioxide absorbing solution containing an alkanolamine and a sulfur amino acid represented by the following formula (1) or (2):

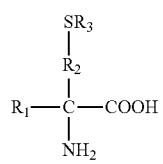
(1)

(in which each of $R_1$ and $R_3$ is independently hydrogen or an organic group having one or more carbon atoms, and $R_2$ is a divalent organic group having one or more carbon atoms)

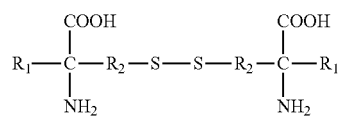
(2)

(in which each of $R_1$ and $R_3$ is independently hydrogen or an organic group having one or more carbon atoms, and $R_2$ is a divalent organic group having one or more carbon atoms).

Effect of the Invention

The present invention enables to provide a carbon dioxide absorbing solution that prevents production of BICINE, which is an oxidization degradation product of alkanolamine.

BEST MODE FOR CARRYING OUT THE INVENTION

Embodiments of the present invention are described below in detail.

(Carbon Dioxide Absorbing Solution)

First, the carbon dioxide absorbing solution is explained. The carbon dioxide absorbing solution according to the present invention is characterized by containing an alkanolamine and a sulfur amino acid represented by the formula (1) or (2). Those components are individually described below. If necessary, the absorbing solution of the present invention may further contain nitrogen-containing compounds such as piperazine, ethylaminopiperazine and 2-methylpiperazine, which are capable of assisting absorption of carbon dioxide, and other compounds such as a pH regulator in desired concentrations.

<Alkanolamine>

The alkanolamine mainly contributes to absorption of carbon dioxide. Because of the recovering process described later, the alkanolamine must be water-soluble as well as it must absorb carbon dioxide. Here, the term "water-soluble" means that the alkanolamine can be dissolved in water, and specifically it means that one or more weight parts of the alkanolamine can be dissolved in 99 weight parts of water.

Examples of the alkanolamine include triehtanolamine (hereinafter, referred to as "TEA"), MDEA, diethanolamine (hereinafter, referred to as "DEA"), diisopropanolamine (hereinafter, referred to as "DIPA"), diglycolamine (hereinafter, referred to as "DGA"), MEA, and aminomethylpropanol (hereinafter, referred to as "AMP"). Those are preferred because they not only absorb large amounts of carbon dioxide but also have low boiling points and hence hardly volatilize so that less amount of energy is consumed in the step of $CO_2$ separation and desorption.

<Sulfur Amino Acid>

In the carbon dioxide absorbing solution of the present invention, the sulfur amino acid mainly contributes to preventing oxidization and degradation of the above-described alkanolamine. In the presence of oxygen, oxygen atoms combine with sulfur atoms in the sulfur amino acid and, as a result, the sulfur amino acid itself is oxidized to protect the alkanolamine from oxidization and degradation.

The sulfur amino acid is represented by the formula (1) or (2), and examples thereof include cysteine, cystine, methionine and glutathione. Among them, cysteine and cystine are particularly preferred because they are suitable for mass-production and hence easily available.

<Contents of Alkanolamine and Sulfur Amino Acid>

In the present invention, the content of the alkanolamine is preferably 5 to 60 weight parts based on 0.1 to 1.0 weight part of the sulfur amino acid. Those amounts enable both to ensure absorption of carbon dioxide and to reduce oxidization and degradation of the alkanolamine in the carbon dioxide absorbing solution of the present invention.

However, the content ratio between the alkanolamine and the sulfur amino acid is not restricted by the above range as long as the effect of the present invention can be obtained.

(Carbon Dioxide Recovering Process)

The following describes the carbon dioxide recovering process according to the present invention.

First, the alkanolamine and the sulfur amino acid are mixed with water to prepare an aqueous solution. The amount of alkanolamine is preferably 5 to 60 weight parts based on 40 to 95 weight parts of water.

It is also preferred to adjust the pH value of the aqueous solution to pH 7 to 14 inclusive. This pH range increases the amount of carbon dioxide absorbed in the aqueous solution. If TEA, MDEA or DMAE is adopted, the above pH range is inevitably achieved. However, if necessary, it is possible to incorporate a pH regulator or the like.

Successively, the aqueous solution is brought into contact with gases containing carbon dioxide to be absorbed therein. As long as the $CO_2$ gas can be in contact with the aqueous solution, there is no particular restriction on the facilities. Accordingly, it is possible to utilize existing $CO_2$ gas absorption facilities, such as a dispersed gas type absorption system comprising a bubble agitation tank and a bubble tower and a dispersed liquid type absorption system comprising a spray tower, a spray chamber, a scrubber, a wetted-wall tower and a packed tower. From the viewpoint of absorption efficiency, it is preferred to use a $CO_2$ absorption tower filled with filler.

As long as carbon dioxide can be absorbed, there is no particular restriction on the reaction temperature of the $CO_2$ recovering process. However, from the viewpoints of absorption rate and efficiency, the temperature is preferably 25 to 70° C. inclusive. The process may comprise procedures of pressure reduction and membrane separation in addition to the heating procedure.

EXAMPLES

Examples are described below. The components of Examples and Comparative examples are shown in Table 1 together with the amounts of produced BICINE.

Example 1

In 50 weight parts of water, 30 weight parts of TEA as the alkanolamine, 10 weight parts of piperazine as the reaction accelerator and 0.1 weight part of cysteine as the sulfur amino acid were dissolved to prepare a 10 mL aqueous solution, whose pH value was found to be about 12. The solution was heated at 130° C., and a mixed gas of $CO_2$ (about 50%) and $O_2$ (about 50%) was bubbled therein at a flow rate of 1.0 L/minute for 8 hours. The outlet $CO_2$ gas concentration from the solution was measured after 1 hour and again after 8 hours, and was thereby found to be constant. It was thereby verified that the solution surely absorbed carbon dioxide.

The aqueous solution was then analyzed by means of LC/MS (manufactured by Agilent Technologies Inc.), and found that the content of BICINE was 28 ppm.

Example 2

The procedure of Example 1 was repeated except for adopting 1.0 weight part of cysteine as the sulfur amino acid. As a result, it was found that the aqueous solution contained BICINE in an amount of 11 ppm.

Example 3

The procedure of Example 1 was repeated except for adopting 45 weight parts of MDEA as the alkanolamine, 5.0 weight parts of piperazine as the reaction accelerator and 0.1 weight part of cysteine as the sulfur amino acid. As a result, it was found that the aqueous solution contained BICINE in an amount of 19 ppm.

Example 4

The procedure of Example 1 was repeated except for adopting 45 weight parts of MDEA as the alkanolamine, 5.0 weight parts of piperazine as the reaction accelerator and 1.0 weight part of cysteine as the sulfur amino acid. As a result, BICINE was not detected in the aqueous solution.

Example 5

The procedure of Example 1 was repeated except for adopting 50 weight parts of DEA as the alkanolamine, 5.0 weight parts of ethylaminopiperazine as the reaction accelerator and 0.1 weight part of cysteine as the sulfur amino acid. As a result, it was found that the aqueous solution contained BICINE in an amount of 31 ppm.

Example 6

The procedure of Example 1 was repeated except for adopting 50 weight parts of DEA as the alkanolamine, 5.0 weight parts of ethylaminopiperazine as the reaction accelerator and 1.0 weight part of cysteine as the sulfur amino acid. As a result, it was found that the aqueous solution contained BICINE in an amount of 18 ppm.

Example 7

The procedure of Example 1 was repeated except for adopting 30 weight parts of DIPA as the alkanolamine, 10 weight parts of 2-methylpiperazine as the reaction accelerator and 0.1 weight part of cysteine as the sulfur amino acid. As a result, it was found that the aqueous solution contained BICINE in an amount of 31 ppm.

Example 8

The procedure of Example 1 was repeated except for not using the reaction accelerator and for adopting 40 weight parts of DGA as the alkanolamine and 0.1 weight part of cysteine as the sulfur amino acid. As a result, it was found that the aqueous solution contained BICINE in an amount of 11 ppm.

Example 9

The procedure of Example 1 was repeated except for not using the reaction accelerator and for adopting 30 weight parts of MEA as the alkanolamine and 0.1 weight part of cysteine as the sulfur amino acid. As a result, it was found that the aqueous solution contained BICINE in an amount of 14 ppm.

Example 10

The procedure of Example 1 was repeated except for not using the reaction accelerator and for adopting 30 weight parts of AMP as the alkanolamine and 0.1 weight part of cysteine as the sulfur amino acid. As a result, it was found that the aqueous solution contained BICINE in an amount of 25 ppm.

Example 11

The procedure of Example 1 was repeated except for adopting 30 weight parts of TEA as the alkanolamine, 10 weight parts of piperazine as the reaction accelerator and 0.1 weight part of cystine as the sulfur amino acid. As a result, it was found that the aqueous solution contained BICINE in an amount of 20 ppm.

Example 12

The procedure of Example 1 was repeated except for adopting 45 weight parts of TEA as the alkanolamine, 10 weight parts of piperazine as the reaction accelerator and 1.0 weight part of cystine as the sulfur amino acid. As a result, it was found that the aqueous solution contained BICINE in an amount of 5 ppm.

Example 13

The procedure of Example 1 was repeated except for adopting 45 weight parts of MDEA as the alkanolamine, 5.0 weight parts of piperazine as the reaction accelerator and 0.1 weight part of cystine as the sulfur amino acid. As a result, it was found that the aqueous solution contained BICINE in an amount of 13 ppm.

Example 14

The procedure of Example 1 was repeated except for adopting 45 weight parts of MDEA as the alkanolamine, 5.0 weight parts of piperazine as the reaction accelerator and 1.0 weight part of cystine as the sulfur amino acid. As a result, BICINE was not detected in the aqueous solution.

Example 15

The procedure of Example 1 was repeated except for adopting 50 weight parts of DEA as the alkanolamine, 5.0 weight parts of ethylaminopiperazine as the reaction accelerator and 0.1 weight part of cystine as the sulfur amino acid. As a result, it was found that the aqueous solution contained BICINE in an amount of 22 ppm.

Example 16

The procedure of Example 1 was repeated except for adopting 50 weight parts of DEA as the alkanolamine, 5.0 weight parts of ethylaminopiperazine as the reaction accelerator and 1.0 weight part of cystine as the sulfur amino acid. As a result, it was found that the aqueous solution contained BICINE in an amount of 15 ppm.

Example 17

The procedure of Example 1 was repeated except for adopting 30 weight parts of DIPA as the alkanolamine, 10 weight parts of 2-methylpiperazine as the reaction accelerator and 0.1 weight part of cystine as the sulfur amino acid. As a result, it was found that the aqueous solution contained BICINE in an amount of 26 ppm.

Example 18

The procedure of Example 1 was repeated except for not using the reaction accelerator and for adopting 40 weight parts of DGA as the alkanolamine and 0.1 weight part of cystine as the sulfur amino acid. As a result, it was found that the aqueous solution contained BICINE in an amount of 7 ppm.

Example 19

The procedure of Example 1 was repeated except for not using the reaction accelerator and for adopting 30 weight parts of
MEA as the alkanolamine and 0.1 weight part of cystine as the sulfur amino acid. As a result, it was found that the aqueous solution contained BICINE in an amount of 10 ppm.

Example 20

The procedure of Example 1 was repeated except for not using the reaction accelerator and for adopting 30 weight parts of AMP as the alkanolamine and 0.1 weight part of cystine as the sulfur amino acid. As a result, it was found that the aqueous solution contained BICINE in an amount of 12 ppm.

Comparative Example 1

The procedure of Example 1 was repeated except for not using the sulfur amino acid. As a result, it was found that the aqueous solution contained BICINE in an amount of 283 ppm.

Comparative Example 2

The procedure of Example 3 was repeated except for not using the sulfur amino acid. As a result, it was found that the aqueous solution contained BICINE in an amount of 173 ppm.

Comparative Example 3

The procedure of Example 5 was repeated except for not using the sulfur amino acid. As a result, it was found that the aqueous solution contained BICINE in an amount of 528 ppm.

Comparative Example 4

The procedure of Example 7 was repeated except for not using the sulfur amino acid. As a result, it was found that the aqueous solution contained BICINE in an amount of 211 ppm.

Comparative Example 5

The procedure of Example 8 was repeated except for not using the sulfur amino acid. As a result, it was found that the aqueous solution contained BICINE in an amount of 74 ppm.

Comparative Example 6

The procedure of Example 9 was repeated except for not using the sulfur amino acid. As a result, it was found that the aqueous solution contained BICINE in an amount of 45 ppm.

Comparative Example 7

The procedure of Example 10 was repeated except for not using the sulfur amino acid. As a result, it was found that the aqueous solution contained BICINE in an amount of 86 ppm.

TABLE 1

|  | Aalkanol amine | Weight parts | Reaction accelerator | Weight parts | Sulfur amino acid | Weight parts | Amount of produced BICINE/ppm |
|---|---|---|---|---|---|---|---|
| Ex. 1 | TEA | 30 | piperazine | 10 | cysteine | 0.1 | 28 |
| Ex. 2 | TEA | 45 | piperazine | 10 | cysteine | 1.0 | 11 |
| Ex. 3 | MDEA | 45 | piperazine | 5.0 | cysteine | 0.1 | 19 |
| Ex. 4 | MDEA | 45 | piperazine | 5.0 | cysteine | 1.0 | 0 |
| Ex. 5 | DEA | 50 | ethylamino-piperazine | 5.0 | cysteine | 0.1 | 31 |
| Ex. 6 | DEA | 50 | ethylamino-piperazine | 5.0 | cysteine | 1.0 | 18 |
| Ex. 7 | DIPA | 30 | 2-methyl-piperazine | 10 | cysteine | 0.1 | 31 |
| Ex. 8 | DGA | 40 | — | — | cysteine | 0.1 | 11 |
| Ex. 9 | MEA | 30 | — | — | cysteine | 0.1 | 14 |
| Ex. 10 | AMP | 30 | — | — | cysteine | 0.1 | 25 |
| Ex. 11 | TEA | 30 | piperazine | 10 | cystine | 0.1 | 20 |
| Ex. 12 | TEA | 45 | piperazine | 10 | cystine | 1.0 | 5 |
| Ex. 13 | MDEA | 45 | piperazine | 5.0 | cystine | 0.1 | 13 |
| Ex. 14 | MDEA | 45 | piperazine | 5.0 | cystine | 1.0 | 0 |
| Ex. 15 | DEA | 50 | ethylamino-piperazine | 5.0 | cystine | 0.1 | 22 |
| Ex. 16 | DEA | 50 | ethylamino-piperazine | 5.0 | cystine | 1.0 | 15 |
| Ex. 17 | DIPA | 30 | 2-methyl-piperazine | 10 | cystine | 0.1 | 26 |
| Ex. 18 | DGA | 40 | — | — | cystine | 0.1 | 7 |
| Ex. 19 | MEA | 30 | — | — | cystine | 0.1 | 10 |
| Ex. 20 | AMP | 30 | — | — | cystine | 0.1 | 12 |
| Com. 1 | TEA | 30 | piperazine | 10 | — | — | 283 |
| Com. 2 | MDEA | 45 | piperazine | 5.0 | — | — | 173 |
| Com. 3 | DEA | 50 | ethylamino-piperazine | 5.0 | — | — | 528 |
| Com. 4 | DIPA | 30 | 2-methyl-piperazine | 10 | — | — | 211 |
| Com. 5 | DGA | 40 | — | — | — | — | 74 |
| Com. 6 | MEA | 30 | — | — | — | — | 45 |
| Com. 7 | AMP | 30 | — | — | — | — | 86 |

The invention claimed is:

1. A carbon dioxide absorbing solution, consisting essentially of:
    at least one alkanolamine selected from the group consisting of triehtanolamine, methyl diethanolamine, diethanolamine, diisopropanolamine, diglycolamine, monoethanolamine, and aminomethylpropanol;
    a sulfur amino acid of formula (1) or (2):

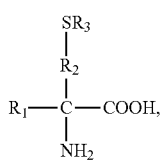

(1)

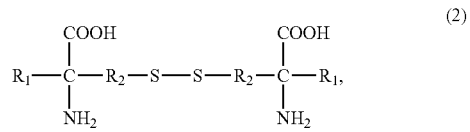

(2)

wherein $R_1$ and $R_3$ are each independently hydrogen or an organic group having one or more carbon atoms, and $R_2$ is a divalent organic group having one or more carbons, wherein each $R_1$ is independently hydrogen or an organic group having one or more carbon atoms, and each $R_2$ is a divalent organic group having one or more carbon atoms; and at least one selected from the group consisting of piperazine, ethylaminopiperazine, and 2-methylpiperazine, wherein the content of the alkanolamine is from 5 to 60 weight parts based on 0.1 to 1.0 weight parts of the sulfur amino acid.

2. The carbon dioxide absorbing solution of claim 1, wherein said sulfur amino acid is cysteine or cystine.

3. The carbon dioxide absorbing solution of claim 1, wherein said sulfur amino acid is cystine.

4. The carbon dioxide absorbing solution of claim 1, wherein alkanolamine is at least one selected from the group consisting of methyl diethanolamine, diisopropanolamine, and diglycolamine.

5. The carbon dioxide absorbing solution of claim 1, further consisting essentially of water, wherein the content of the alkanolamine is from 5 to 60 weight parts based on 40 to 95 weight parts of the water.

6. A carbon dioxide absorbing solution, consisting of:
   at least one alkanolamine selected from the group consisting of triehtanolamine, methyl diethanolamine, diethanolamine, diisopropanolamine, diglycolamine, monoethanolamine, and aminomethylpropanol; and
   a sulfur amino acid of formula (1) or (2):

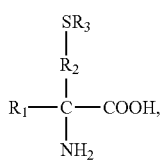
(1)

wherein $R_1$ and $R_3$ are each independently hydrogen or an organic group having one or more carbon atoms, and $R_2$ is a divalent organic group having one or more carbons,

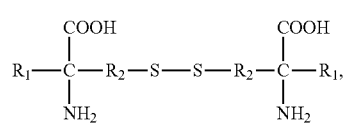
(2)

wherein each $R_1$ is independently hydrogen or an organic group having one or more carbon atoms, and each $R_2$ is a divalent organic group having one or more carbon atoms, wherein the content of the alkanolamine is from 5 to 60 weight parts based on 0.1 to 1.0 weight parts of the sulfur amino acid.

* * * * *